UNITED STATES PATENT OFFICE.

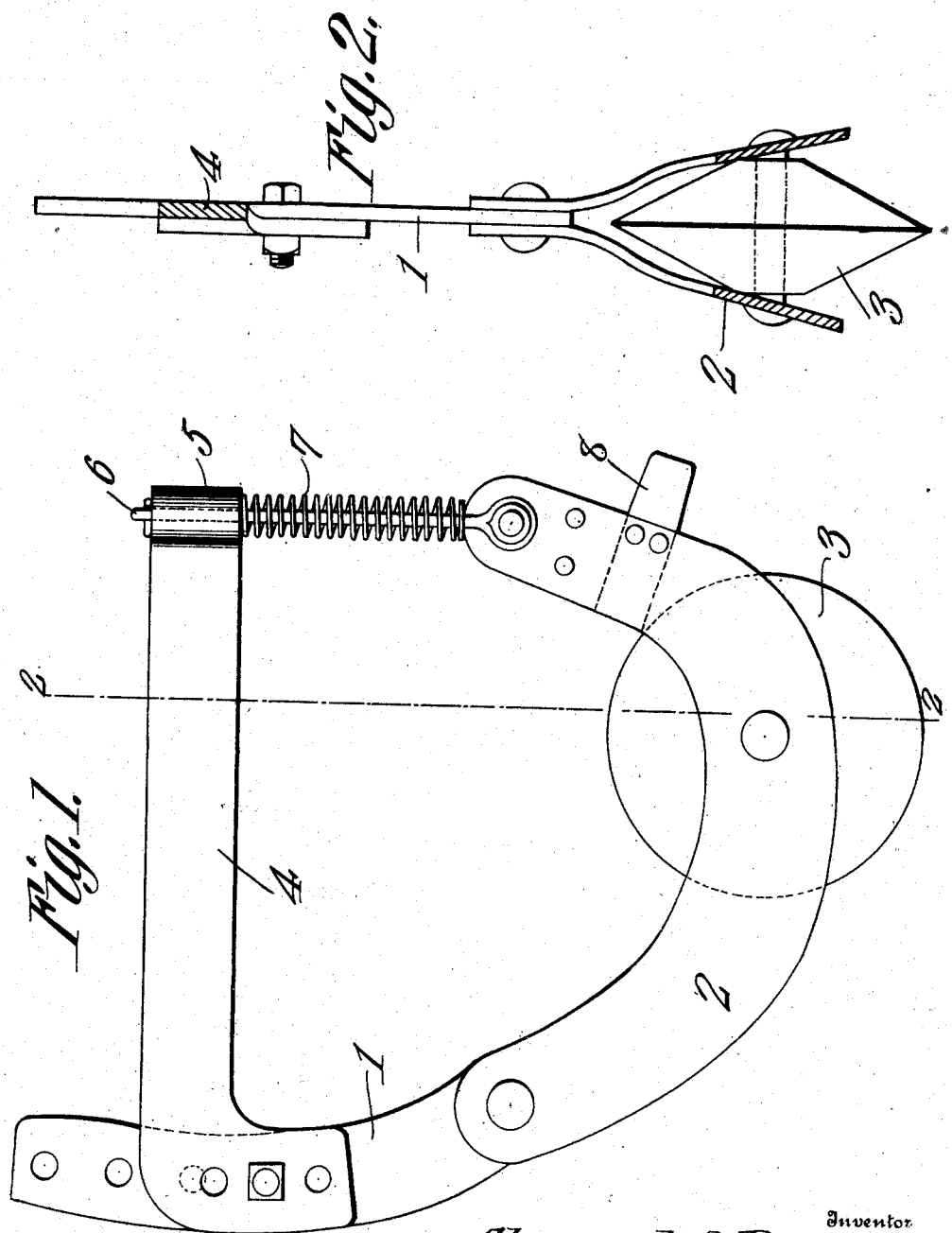

STEWARD A. POGUE, OF NEAR LIBERTY HILL, TEXAS.

FURROW-OPENER.

No. 907,281.  Specification of Letters Patent.  Patented Dec. 22, 1908.

Application filed January 28, 1908. Serial No. 413,136.

*To all whom it may concern:*

Be it known that I, STEWARD A. POGUE, a citizen of the United States, residing near Liberty Hill, in the county of Williamson and State of Texas, have invented a new and useful Furrow-Opener, of which the following is a specification.

This invention has relation to furrow openers adapted to be used upon seed planters and it consists in the novel construction and arrangement of its parts as hereinafter shown and described.

The object of the invention is to provide a spring pressed furrow opener of peculiar configuration which is adapted to roll along the soil and press a furrow in the surface thereof for the reception of the seed. The said rotating member is of such configuration as to permit of its readily passing over obstructions as rock or roots without engaging the same to the detriment of the implement, and by reason of the fact that the said rotating member is spring pressed it opens a furrow with packed or tight walls which maintain the seed in more perfect alinement than where the furrow is opened by a plow or drag member. The rotating member is circular in side elevation and double convex in transverse section and is of sufficient breadth to open up a furrow of sufficient width to receive the seed but the said rotating member does not operate as a cutter or colter as it is designed to ride over obstructions as above described.

Figure 1 is a side elevation of the furrow opener. Fig. 2 is a sectional view cut on the line 2, 2 of Fig. 1.

The furrow opener consists of the link 1 which is adapted to be attached to the frame of a planter such, for instance, as a cotton or corn planter and the forward ends of the runners 2 are pivotally connected to the lower ends of said link. The intermediate portions of the runners 2 adjacent the sides of the opener and between which the said opener 3 is journaled for rotation, are outwardly and downwardly inclined with relation to the axle of the opener 3, and are adapted to have contact with the ground to regulate the depth at which the opener will operate in the ground. The said inclined portions of the runners also have a tendency to cast obstacles, such as stone and trash, away from the opener and the furrow as it is being formed by the opener. The intermediate portions of the runners 2 project, at their lower portions, into positions laterally opposite the lower portions of the convexed sides of the opener 3, and, in addition to casting aside obstacles, as above described, they have the effect of producing, at the upper edges of the sides of the furrow, compact and well-defined crests or ridges of soft material, which may be subsequently rolled or filled into the furrow. The bar 4 is adjustably attached at its forward end to the link 1 and is provided at its rear end with an eye 5. The rod 6 passes through said eye and is pivotally connected at its lower end with the runners 2. The coil spring 7 surrounds the rods 6 and bears at its upper end against the eyes 5 and at its lower end against the runners 2 and is under tension with a tendency to hold the bar 4 and the runners 2 apart. The cuff 8 is mounted upon the runners 2 at the rear of the opener 3 and is adapted to receive the grain tube of the planter to which the device is attached. The opener 3 is circular in side elevation and is double convex in cross section and its breadth at its center is substantially equal to its radius.

From the above description it is obvious that as the furrow opener is drawn along the surface of the soil the rotating member 3 will engage the same and press a furrow in the surface thereof under the tension of the spring 7. Should the said member 3 meet an obstruction as rock or root it will ride over the same without becoming engaged therewith. The furrow which is opened by the member 3 will possess inclined compact walls and the seed which is deposited in the said furrow will lodge in the angle at the bottom thereof and thus will be placed in true alinement so that the resulting plants will stand in straight rows. After the seed has been deposited in the furrow, as above described, it is covered and packed by any means usually employed upon planters to perform such functions.

An advantage gained by the use of this furrow opener is that the walls of the furrow are packed or compressed prior to the time that the seed are deposited therein and consequently when the furrow is closed and packed over the seed the seed is completely incased in packed soil and not in soil which is packed above only as in the case where the furrow is opened by a drag or plow.

Consequently, the compact earth prevents the passage of air and undue drying of the soil by evaporation, hence, the seed will come to a stand with a minimum amount of moisture in the ground.

Having thus described the invention what is claimed is:—

A device as described comprising runners, a double convex furrow opener journaled between the runners, said runners being connected together at points above the furrow opener and at the front and rear sides of the same and having intermediate portions at opposite sides of the opener which are outwardly and downwardly inclined with relation to the axle of the opener and which project, at their lower portions, into positions laterally opposite the lower portions of the convexed sides of the opener.

In testimony that I claim the foregoing as my own, I have hereto affixed my signature in the presence of two witnesses.

STEWARD A. POGUE.

Witnesses:
 A. MATHER,
 J. P. BARKER.